G. H. BOYNTON.
WEIGHING ATTACHMENT FOR WOOL FEEDING MACHINES.
APPLICATION FILED MAY 5, 1913.
1,086,135.
Patented Feb. 3, 1914.
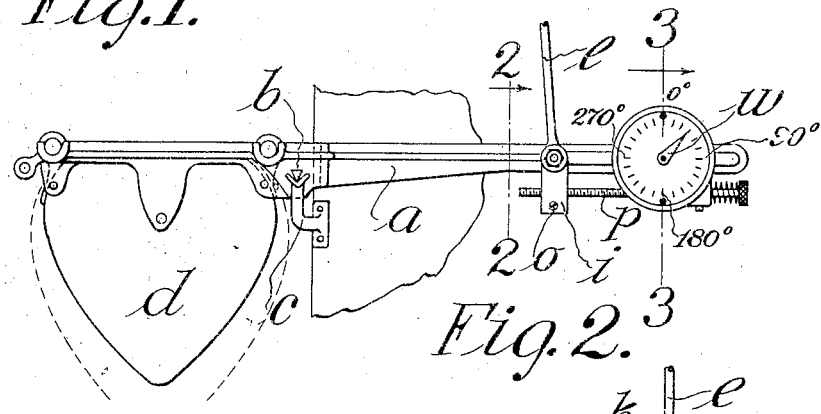
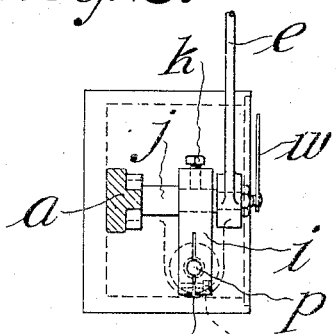
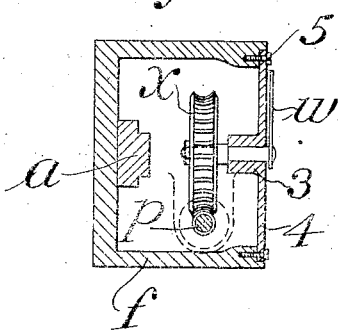
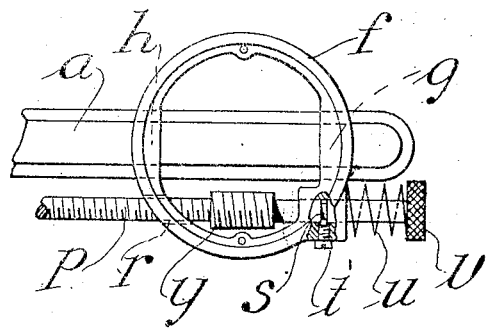
WITNESSES:
M. C. Hunter
H. E. Hartwell
INVENTOR.
George H. Boynton.
BY Chapin & Co.
ATTORNEY.

UNITED STATES PATENT OFFICE.

GEORGE H. BOYNTON, OF PITTSFIELD, MASSACHUSETTS.

WEIGHING ATTACHMENT FOR WOOL-FEEDING MACHINES.

1,086,135.   Specification of Letters Patent.   Patented Feb. 3, 1914.

Application filed May 5, 1913. Serial No. 765,605.

*To all whom it may concern:*

Be it known that I, GEORGE H. BOYNTON, a citizen of the United States of America, residing at Pittsfield, in the county of Berkshire and State of Massachusetts, have invented new and useful Improvements in Weighing Attachments for Wool-Feeding Machines, of which the following is a specification.

This invention relates to improvements in weighing mechanisms for wool-feeding machines.

An object of the invention is to provide a delicate attachment for wool-working machines whereby the weight of the yarn that falls into the weighing receptacle may be very accurately determined.

Heretofore, it often occurs that the "run" or weight of the yarn is not known until it has been woven into the finished cloth, when it is too late to correct the error. Oftentimes, customers wish a wool cloth or weave of a definite weight per yard, and, as stated, if the weight of the finished cloth does not agree with the weight called for a loss in the sale of the finished cloth occurs. My invention is therefore designed to overcome this objection and to provide the weighing machine attendant with an accurate device for indicating the weight or "run" of the yarn in the scale pan before the machine is tripped to discharge the yarn.

Broadly, the invention consists in providing the scale or weighing beam with a poise that can be very accurately adjusted to any "run" of yarn, and, in addition, a pointer device by means of which the machine attendant can readily determine the position of the poise by means of the pointer.

Referring to the drawings which form a part of the specification and in which—

Figure 1 is a side elevation of the improvement, showing the poise attached to and in place on the scale beam; Fig. 2 is a transverse sectional view on the broken line 2—2 of Fig. 1 and showing the scale beam in section, and the poise in outline; Fig. 3 is a transverse sectional view on the line 3—3 of Fig. 1 showing the interior construction of the poise and the mechanism for operating the pointer; and Fig. 4 is a side elevation of the free end of the scale beam showing the interior construction of the poise box and the adjusting screw or worm.

Referring to the drawings in detail,—$a$ designates the usual scale beam of a wool-feeding machine that is pivoted to the framework of the machine at $b$ by means of the bracket-arm $c$. Attached to the scale-beam $a$ is the receptacle $d$ into which the yarn falls. The contents of this pan are automatically discharged by means of the usual trip-mechanism that is attached to the beam $a$ by means of the rod $e$ which causes the usual doors of the receptacle $d$ to open when the weight of the yarn in the receptacle over-balances the poise carried by the scale-beam. This part of the description of a wool-feeding machine is of common construction and need not be referred to in detail.

Coming now to the construction and operation of my specific improvement,—$f$ designates a hollow U-shaped poise-member that is mounted on the scale-beam $a$, an opening being formed in the sides of the poise at substantially opposite points, as indicated in Fig. 4 at $g$ and $h$. Fixedly secured to the beam $a$ is a bracket-arm $i$ by means of stud $j$ and set-screw $k$. The lower end of the arm $i$ is split as indicated at $m$. A transversely-arranged screw $o$ passes through the lower end portion of the bracket $i$, as shown, and is for the purpose of drawing the two separated portions of the bracket together to produce a clamping or pinching effect on the threaded rod $p$ which passes through a threaded opening in the bracket $i$. This threaded rod is for the purpose of adjusting the position of the poise $f$ and to effect this result the rod $p$ is passed through the opening $r$ at one side of the poise $f$ and an opening $s$ at the other side of the poise, and at this latter opening a stud or pin $t$ enters a groove in the rod $p$ in order to retain the threaded rod $p$ in place. A spring $u$ is located between the poise $f$ and the milled head $v$ of the rod $p$ in order to take up any lost motion between the threaded rod and the poise. It will, therefore, be seen that when the rod $p$ is rotated the poise is moved along the scale-beam $a$. For the purpose of indicating this adjustment of the poise and to determine the "run" or weight of the yarn in the receptacle $d$, a pointer $w$ is operated at the same time that the milled head $v$ is rotated. To effect the movement of the pointer $t$, a worm-gear $x$ is arranged to engage the worm $y$ of the thread that lies within the poise $f$. This worm gear is mounted in the boss 3 of the graduated cover 4 which is secured to the poise $f$ by means of screws 5. The rotation of the milled head $v$ will, of course, cause the pointer $w$ to move in unison as the poise $f$ is moved along the beam $a$ and preferably in the direction in which the worm $y$ is rotated;—that is to say, when the pointer moves in the direction of the hands of a clock the screw is turned right-handedly.

Referring now to the use and operation of the improvement and first considering the cover 4 as being arbitrarily divided into 360 divisions or degrees: If a "two run" yarn, which weighs, say, 225 grains, of 1000 yards, is required, the pointer $w$ is arbitrarily set at 45° from the zero position, indicated at the top of the dial-plate. If a "three run" yarn is required, the pointer is turned backward from the zero position, as, for instance, to 315°, it being understood that the "three run" yarn is lighter in weight than the "two run," as, for example, 175 grains, while the "two run" may weigh 225 grains, and a "four run" may weigh 125 grains, in which case the pointer would be turned still farther back. The pointer can, therefore, be set for any particular "run" of yarn and, simultaneously, adjust or position the poise for that "run." After the dial has been set for a particular "run," the screw $o$ is tightened to retain the poise in place.

It is, of course, understood that the graduations of the dial plate or cover 4 are merely arbitrary. They merely indicate, in a general way, to the workman that by trial and experiment 1000 yards of yarn will weigh 225 grains when the pointer indicates 45°. It is, of course, understood that the rotation of the pointer so simultaneously moves the poise $f$ on the scale beam or arm $a$.

What I claim, is,—

In a yarn-weighing mechanism for wool-feeding machines, the combination, with the scale-beam of the machine, a receptacle to receive the yarn to be weighed attached to the scale-beam, a hollow poise slidably mounted on said beam, a bracket fixedly secured to the beam and having a threaded opening therein, a threaded rod passing through said opening in the bracket, means to rotatably attach the rod to the poise, a worm-gear rotatably mounted within the poise and engaging the worm on the rod that lies within the poise, a spring to take up any lost motion of the rod, a pointer secured to and moving with the worm gear, whereby when the rod is rotated the pointer will move in unison with the poise, and a graduated dial over which the pointer moves to designate the position of the poise and to determine the weight or "run" of material being weighed, and means on the bracket to retain the poise and threaded rod in place, as described.

GEORGE H. BOYNTON.

Witnesses:
DENIS T. NOONAN,
JAMES CHAPMAN.